US009441998B2

(12) United States Patent
Pilipchenko et al.

(10) Patent No.: US 9,441,998 B2
(45) Date of Patent: Sep. 13, 2016

(54) OVAL GEAR METER

(71) Applicant: Ecolab USA Inc., St. Paul, MN (US)

(72) Inventors: Anna Pilipchenko, Duluth, MN (US); William M. Christensen, Hibbing, MN (US); Eugene Tokhtuev, Duluth, MN (US)

(73) Assignee: Ecolab USA Inc., St. Paul, MN (US)

( * ) Notice: Subject to any disclaimer, the term of this patent is extended or adjusted under 35 U.S.C. 154(b) by 242 days.

(21) Appl. No.: 14/336,921

(22) Filed: Jul. 21, 2014

(65) Prior Publication Data

US 2016/0018247 A1    Jan. 21, 2016

(51) Int. Cl.

| G01F 1/66 | (2006.01) |
|---|---|
| G01F 3/10 | (2006.01) |
| G01F 15/00 | (2006.01) |
| G06M 1/272 | (2006.01) |

(52) U.S. Cl.
CPC ............. *G01F 3/10* (2013.01); *G01F 15/00* (2013.01); *F04C 2220/24* (2013.01); *G01F 1/661* (2013.01); *G06M 1/272* (2013.01)

(58) Field of Classification Search
CPC ...... F04C 2220/24; G01F 1/661; G01F 3/10; G06M 1/272
See application file for complete search history.

(56) References Cited

U.S. PATENT DOCUMENTS

| 3,878,391 | A | * | 4/1975 | McClelland, III | G01R 11/00 250/233 |
| 4,195,522 | A | * | 4/1980 | Anderson | G01F 1/065 73/861.79 |
| 4,327,362 | A | * | 4/1982 | Hoss | G01R 11/02 250/231.14 |
| 4,956,551 | A | * | 9/1990 | Repschlager | G01R 11/16 250/231.14 |
| 5,542,302 | A | * | 8/1996 | McMillan | G01F 1/06 73/861.77 |
| 5,565,861 | A | * | 10/1996 | Mettler | G01D 5/2415 340/870.02 |
| 5,728,949 | A | * | 3/1998 | McMillan | G01F 1/06 73/861.77 |
| 5,750,983 | A | * | 5/1998 | Swanson | G01D 4/008 250/231.13 |
| 5,902,938 | A | * | 5/1999 | Beaudoin | G01F 1/065 73/861.77 |
| 6,945,125 | B2 | * | 9/2005 | Vanderah | G01F 3/10 73/861.77 |
| 7,265,843 | B2 | * | 9/2007 | Demia | G01D 4/00 250/221 |
| 7,426,875 | B1 | * | 9/2008 | McMillan | G01F 1/065 73/861.79 |
| 7,523,660 | B2 | | 4/2009 | Albrecht et al. | |
| 7,851,775 | B2 | * | 12/2010 | Hoyt | G01F 3/10 250/231.5 |
| 8,069,719 | B2 | | 12/2011 | Tokhtuev | |
| 8,166,828 | B2 | | 5/2012 | Skirda et al. | |
| 8,496,457 | B2 | * | 7/2013 | Varga | F04C 2/18 417/410.4 |
| 2003/0175141 | A1 | * | 9/2003 | Cavanaugh | F01C 1/084 418/206.5 |
| 2007/0098576 | A1 | * | 5/2007 | Horng | F04C 2/18 417/420 |

\* cited by examiner

*Primary Examiner* — David A Rogers (74) *Attorney, Agent, or Firm* — Fredrikson & Byron, P.A.

(57) ABSTRACT

Embodiments include a flow measuring system for measuring characteristics of a fluid flow. The flow measuring system can include a pair of rotating members rotating synchronously to the fluid flow. At least one rotating member can include a normally-reflecting portion and a non-normally reflecting portion. The normally-reflecting portion reflects an incident beam in a direction parallel to the normal direction of the plane of the normally-reflecting portion. The non-normally reflecting portion reflects the incident beam in a direction non-parallel to the normal direction of the plane of the normally-reflecting portion. The flow measuring system measures the optical characteristics of a beam reflected by the normally-reflecting portion and determines rotational characteristics of the rotating member. The flow measuring system determines characteristics of the flow based on the rotational characteristics of the rotating member.

24 Claims, 7 Drawing Sheets

OVAL GEAR METER

FIELD

This disclosure generally relates to systems and methods for measuring fluid flow. More specifically, the disclosure relates to an oval gear flow meter and methods of using the same.

BACKGROUND

Positive displacement fluid measurement systems can be used to measure a fluid flow rate or volume. For example, dispensing systems can use feedback from a positive displacement fluid meter to control the volume of fluid dispensed. Such control systems can be used in lieu of time-on controls to more accurately dispense precise amounts of fluid. An exemplary positive displacement fluid measurement system is an oval gear meter as described in U.S. Pat. No. 8,166,828; U.S. Pat. No. 8,069,719; and U.S. Pat. No. 7,523,660 each assigned to Ecolab Inc., St. Paul, Minn., the disclosure of each of which is hereby incorporated by reference in its entirety. A typical oval gear meter provides a pair of oval gears positioned within an oval gear chamber such that the gears rotate synchronously. In an oval gear meter, pockets are defined between the rotating oval gears and the inner chamber wall. Typically, fluid does not pass directly between the gears, and the volume of fluid exiting the chamber during each rotation is known. Conversely, the volume of fluid flow through a gear meter can be measured by measuring the number of rotations of the gears. Likewise, flow rate can be determined from the speed with which the gears rotate.

The rotational count and/or speed of rotation of gears can be measured in a number of different ways. For example, a timing gear system can be located external to the oval gear meter to measure the number of rotations of the oval gears and generate an appropriate signal representative of the volume flow rate of the fluid. Oval gear and other positive displacement flow meters utilizing timing gear systems usually have a gear chamber that includes one or more shaft apertures for the shafts coupling the gears to the external timing gears. In other cases, some gear meters instead use a non-contact sensor placed outside a substantially sealed chamber to determine gear rotation within the chamber. For example, non-contact magnetic sensors have been used to measure gear rotation.

Another example of a non-contact sensor is described in U.S. Pat. No. 7,523,660 assigned to Ecolab Inc., St. Paul, the disclosure of which is hereby incorporated by reference in its entirety. As the trigger gear rotates in response to fluid flow, the magnetic field generated by the permanent magnet also rotates. A magnetic sensor such as a GMR sensor (giant magneto resistance effect sensor) senses rotation of the magnetic field and generates an output signal representative of gear rotation. When calibrated against known volume or volumetric flow rate, the rotational count or speed of rotation of the gears respectively, the gears meter can be useful for measuring flow characteristics. One or more GMR sensor elements may be used to monitor rotation of the trigger wheel.

SUMMARY OF THE INVENTION

Certain embodiments of the invention include a flow measuring system. The flow measuring system can include a pair of rotating members rotating synchronously in response to a fluid flow to be measured by the flow measuring system. At least one rotating member can include a normally-reflecting portion adapted to reflect an incident beam in a direction toward a detector. In some embodiments, the rotating member can reflect the beam in a direction parallel to the normal direction "N" of the plane of the normally-reflecting portion. At least one rotating member also includes a non-normally reflecting portion adapted to reflect the incident beam in a direction away from the detector. In certain embodiments, the non-normally reflecting portion can reflect the incident beam in a direction non-parallel to the normal direction "N" of the plane of the normally-reflecting portion. The flow measuring system can determine rotational characteristics of the rotating member based on the optical characteristics of a beam reflected by the normally-reflecting portion. The flow measuring system determines flow characteristics based on rotational characteristics of the rotating member.

In certain embodiments, the flow measuring system includes a housing fluidly coupled to a fluid inlet and a fluid outlet. The housing can define a passage for a flow of a fluid. A first rotating member and a second rotating member can be disposed in the housing. The second rotating member can intermesh with the first rotating member.

In some embodiments, a sensor is operatively connected to the housing, and is optically aligned with the normally-reflecting portion. The sensor can measure optical characteristics of a beam reflected by the normally-reflecting portion. The sensor can determine at least one of a rotational count indicative of a number of rotations of the first rotating member or second rotating member, and a speed of rotation of the first rotating member or second rotating member based on the optical characteristics of the beam reflected by the normally-reflecting portion.

In certain embodiments, the sensor of the flow measuring system includes an emitter and a detector. The emitter can emit electromagnetic radiation toward at least the normally-reflecting portion, and the detector can detect electromagnetic radiation reflected by the normally-reflecting portion. The detector can be oriented such that at least a surface of the detector is parallel to the plane of the normally-reflecting portion. The surface of the detector can intercept the electromagnetic radiation reflected by normally-reflecting portion.

In some embodiments, the non-normally reflecting portion comprises a plurality of grooves, each groove adapted to reflect the incident beam in a direction away from the detector. In some embodiments, the plurality of the grooves can reflect the incident beam in a direction non-parallel to the normal direction "N" of the plane of the normally-reflecting portion. Each of the plurality of grooves can have a triangular cross-section. Each of the plurality of grooves can have a groove angle defined by a first sloping surface and a second sloping surface of the groove. In certain embodiments, the groove angle is not equal to 90 degrees. A first beam of electromagnetic radiation can be incident on the first sloping surface of the groove. The first beam of electromagnetic radiation can be reflected by the first sloping surface toward the second sloping surface. The second sloping surface can reflect the first beam of electromagnetic radiation in a direction non-parallel to the normal direction "N" of plane of the normally-reflecting portion. In one embodiment, the grooves are disposed in a spiral pattern about an axis of the rotating member. In another embodiment, the grooves are disposed concentrically about an axis of the rotating member. In still another embodiment, the grooves are disposed radially about an axis of the rotating member.

The details of one or more embodiments of the invention are set forth in the accompanying drawings and the description below. Other features, objects, and advantages will be apparent from the description and drawings, and from the claims.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
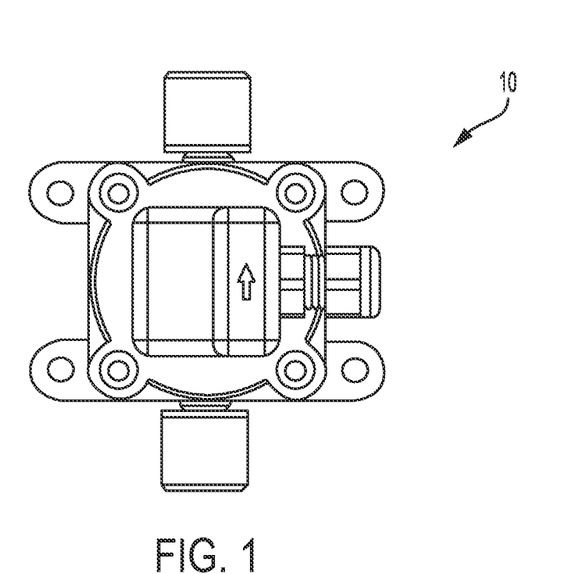
FIG. 1 is a front view of a positive displacement flow meter according to some embodiments of the invention.
Figure 2:
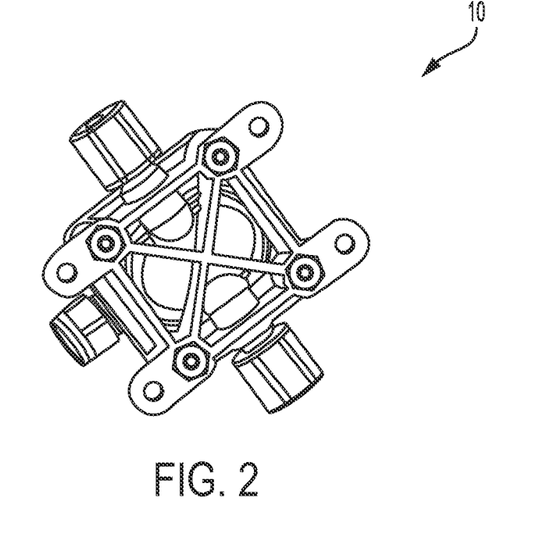
FIG. 2 is a back perspective view of the positive displacement flow meter of FIG. 1.

FIGS. 1-2 show front elevation and back perspective views of a positive displacement flow meter 10 according to certain embodiments. The positive displacement flow meter 10 can be fluidly coupled to a fluid system (not shown) for measuring 162 various characteristics (e.g., volume, flow rate, flow direction, etc.) of a fluid flow. The positive displacement flow meter 10 can be used in conjunction with fluids such as detergents, sanitizers, biological fluids, etc.

Figure 3:
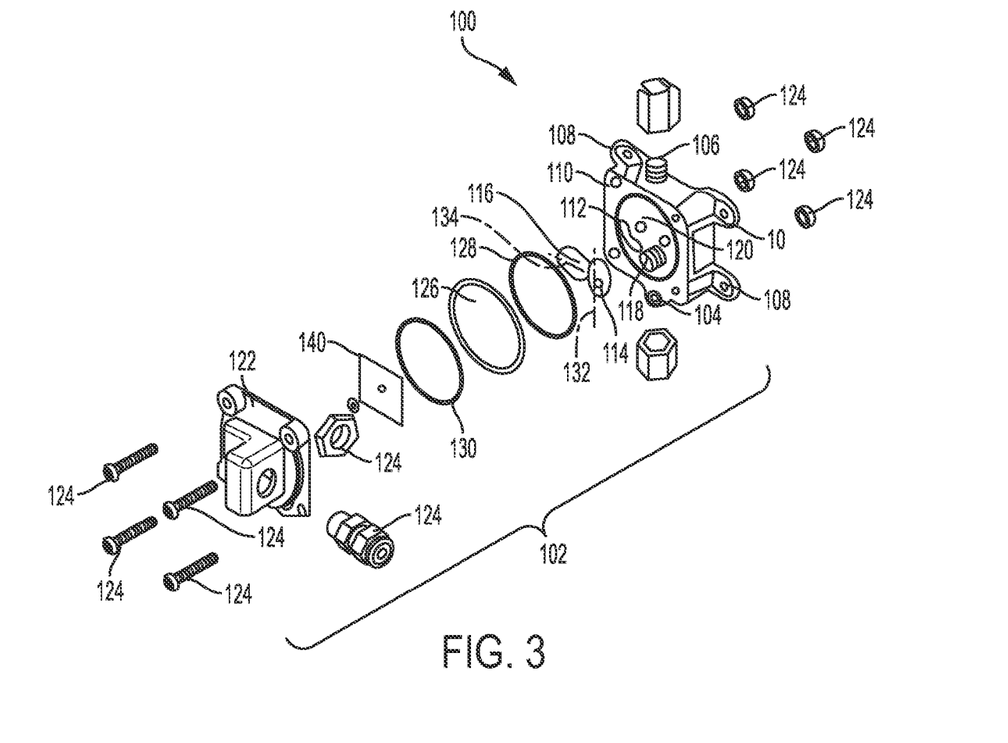
FIG. 3 is an exploded perspective view of an oval gear flow meter according to some embodiments of the invention.

The positive displacement flow meter 10 can be used in fluid systems such as fluid dispensing systems, fluid flow regulating systems and the like. For instance, the positive displacement flow meter 10 can be used to measure volume, concentration and flow rate of cleaning solutions for cleaning and/or sanitizing various facilities (e.g., healthcare facilities, food and beverage industries, public facilities, institutions, and the like). In such cases, monitoring characteristics of the flow can prevent out-of-product conditions from occurring during a cleaning or sanitizing operation. In one embodiment, the positive displacement flow meter 10 can be an oval gear meter 100, as illustrated in FIG. 3. The oval gear meter 100 can measure one or more characteristics of a fluid flow by allowing the fluid flow to displace one or more components of the oval gear meter 100.

With continued reference to FIG. 3, the oval gear meter 100 has a housing 102. The housing 102 can include one or more flow passages 104, 106 in fluid communication with a fluid system. One or more flanges 108 may allow the oval gear meter 100 to be mounted on a support surface (e.g., a wall, not shown) via fasteners (e.g., screws, bolts and the like, not shown). As seen in FIG. 3, the housing 102 includes a base 110 in fluid communication with the flow passages of the fluid system. The base 110 can define a chamber 112 therein to house a pair of gears 114, 116. In certain embodiments, the chamber can have a chamber inlet 118, and a chamber outlet 120. In the embodiment illustrated in FIG. 3, fluid enters via the flow passage 104, on to the chamber inlet 118. The fluid exits via the chamber outlet 120 and the flow passage 106.

A cover 122 is secured to the base 110 using a number of fasteners 124 (e.g., bolts and nuts, screws, etc.). The cover 122 can be removably connected to the base 110 using the fasteners 124. Alternatively, the cover 122 may be fixedly connected or bonded permanently to the base 110 (e.g., via adhesives, plastic weld, etc.). As shown in FIG. 3, the cover 122 and the base 110 encapsulate a separation member 126, thereby securing 162 the separation member 126 against the chamber, thus eliminating the need to directly fasten the separation member 126 to the base 110 with fasteners (e.g., screws, bolts, etc.). When positioned between the base 110 and the cover 122, the separation member 126 forms a fluid tight seal (e.g., via seals 128, 130) and prevents fluids from contacting the cover 122. Alternatively, the separation member 126 can be coupled to the base 110 with fasteners, adhesives, and the like. Two seals (e.g., elastomer O-rings) 128, 130 abut interior and exterior surfaces of the separation member 126, between the base 110 and the separation member 126 and the cover 122 and the separation member 126, respectively, to further provide a fluid-tight seal. The separation member 126 can be accessed by an operator due to the removable coupling between the base 110 and the cover 122 for cleaning or replacing the separation member 126. In some cases, one separation member 126 (e.g., acid resistant) can be removed and replaced it with another separation member 126 (e.g., alkali resistant) to make the oval gear meter 100 compatible with a variety of materials.

The separation member 126 can be made of materials such as glass, sapphire, borosilicate, polymethylpentene, polysulfone, polyetherimide, polypropylene, polycarbonate, polyester, PVC, acrylic glass, and the like. Additionally, the separation member 126 can be made from one or more materials that are biocompatible and/or sufficiently chemically inert to the fluids flowing through the chamber. For instance, if the fluid passing through the chamber includes chemicals of wide range of pH (acids, alkalis and organic substances), oxidizers, and other corrosive chemicals, the separation member 126 can be made from an inert material such as sapphire or borosilicate. Other materials known in the art may also be used. The separation member 126 can be made of the same material as the cover 122. Alternatively, the separation member 126 can be made of a material different from the cover 122. For instance, the cover 122 can be made of a moldable plastic material such as polymethylpentene, polysulfone, polyetherimide, polypropylene, polycarbonate, polyester, and/or PVC.

The separation member 126 can have properties suitable for use with a variety of fluids and operating conditions. For instance, the separation member 126 can be planar (e.g., sheet-like or plate-like) with a thickness of a few millimeters. In one example, the thickness of the separation member 126 can be less than about 15 millimeters. In another example, the thickness is between about 1 millimeter and about 2 millimeters. It can be appreciated that any other thicknesses can be used as appropriate. The separation member 126 can also have suitable mechanical properties (e.g., impact resistance, hardness, density etc.) and thermal properties (e.g., thermal conductivity, coefficient of thermal expansion etc.) suitable for use with a variety of fluids. As seen in FIG. 3, the oval gear meter 100 includes a first gear 114 and a second gear 116. Alternatively, other positive displacement flow meters can include first and second rotational members adapted to rotate synchronously in response to a fluid flow. Characteristics such as total volume, flow rate, and flow direction can then be measured based rotation of the first and second gears 114, 116 (or other rotational members) as the fluid passes through the chamber, entering 162 via the chamber inlet and leaving via the chamber outlet. In the illustrated embodiment, the first and second gears 114, 116 are oval shaped (e.g., ellipsoid), having a first major axis 132 and a second major axis 134. In alternate embodiments, the first and second gears 114, 116 can have any shape (e.g., circular, dog-bone, lobe shaped, helical etc.). In the illustrated embodiment shown in FIG. 3, the first and second gears 114, 116 include a plurality of gear teeth 136 peripherally located on the first and second gears 114, 116. The teeth 136 of the first and second gears 114, 116 mesh with each other over a portion of the perimeters of the first and second gears 114, 116. The first and second gears 114, 116 rotate synchronously due to the intermeshing gear teeth 136, rotating about the first and second major axes. When a volume of fluid enters the chamber and impinges on the first and second gears 114, 116, the first and second gears 114, 116 begin rotating. As the first and second gears 114, 116 turn, they trap the volume of fluid in the chamber because of the proximity of the teeth 136 to the chamber walls. Because the chamber wall nearly abuts an outermost point on at least one gear tooth 136, throughout their rotation, this volume of fluid is trapped between the chamber wall and the surface of the teeth 136 and swept from the chamber inlet 118 to the chamber outlet 120. Moreover, because the first and second gears 114, 116 intermesh with each other during rotational movement, no fluid passes between the first and second gears 114, 116.

In certain embodiments, the first and second gears 114, 116 can be of materials such as molded polymers. Alternatively, or additionally, the first and second gears 114, 116 can be of materials resistant to corrosive chemicals. For example, if the oval gear meter 100 is used to monitor flow characteristics of fluids such as concentrated detergents, sanitizers, rinse aids and the like, the first and second gears 114, 116 can be made of molded or machined plastic such as Polyether Ether Ketone (PEEK) and/or ceramics. The first and second gears 114, 116 can be made of other materials such as polymers or crystallized thermoplastics (e.g., Polytheramides, Polyphenylene sulfide and the like) having desired durability, temperature tolerance characteristics, coefficient of thermal expansion, moisture absorption characteristics, and chemical inertness. Additionally, the first and second gears 114, 116 can be made of biocompatible materials suitable for use in fluid systems involving biological fluids.

In certain exemplary embodiments, the first and second gears 114, 116 may not include any gear teeth 136 and each of the first and second gears 114, 116 may have a smooth outer surface in contact with each other. Such embodiments may be suitable for measuring 162 flow characteristics of fluids that have a viscosity capable of preventing slippage between the first and second gears 114, 116. Alternatively, the first and second gears 114, 116 having intermeshing gears may be useful for measuring 162 flow characteristics of fluids having lower viscosity and/or higher lubricity fluids than fluids which prevent gear slippage.

Although not shown in FIGS. 1-3, the fluid system can include a non-contact sensor configured to detect movement of the first and second gears 114, 116. In an exemplary embodiment, the non-contact sensor can be positioned on or connected operatively to the cover 122. Various types of non-contact sensors can be incorporated into the flow meter to detect the movement of the first and second gears 114, 116 from outside the chamber. In some embodiments, the non-contact sensor is an optical sensor. An example of a non-contact optical sensor is described in U.S. Pat. No. 8,069, 719, assigned to Ecolab Inc., St. Paul, Minn., the disclosure of which is hereby incorporated by reference in its entirety. The optical sensor can view an optical characteristic of either of the first and second gears 114, 116, and based upon the measured optical characteristic of the first or second gears 114, 116, characteristics such as fluid volume, flow rate, and/or flow direction can be determined. The optical sensor can be any sensor capable of detecting the optical characteristic of the first and/or second gears 114, 116 used to determine the rotational position of the first and/or second gears 114, 116.

Non-contact optical sensors can be used to measure any optical characteristic such as reflectance or transmittance. In some embodiments, the sensor can measure reflectance. In such embodiments, the optical sensor can include an emitter for emitting electromagnetic radiation at one or more wavelengths and a detector for detecting reflected electromagnetic radiation from a portion of the first or second gear 116. The emitter can be positioned to receive reflected electromagnetic radiation of all or a portion of the range of reflected wavelengths. The emitter can emit electromagnetic radiation of any wavelength such as Ultraviolet (UV), visible, infrared (IR) and other spectrum. In some embodiments, the emitter can be a laser source, one or more halogen lamps, fluorescent lamps, or light emitting diodes (LED) emitting visible radiation at a specific wavelength (e.g., at 550 nm, 632 nm, etc.). Alternatively, UV emitters (e.g., deuterium lamp) emitting ultraviolet radiation (e.g., at 285 nm) or IR sources (e.g., IR lasers, Xenon lamps etc.) emitting infrared radiation (e.g., at 920 nm, 940 nm etc.) can be used to emit electromagnetic radiation toward the first and second gears 114, 116. In some embodiments, the detector can be a phototransistor. However, any detector (e.g., IR camera, UV detector, photodiodes etc.) can be used to detect the reflected wavelength. Alternatively, the sensor can measure transmittance. In such embodiments, the optical sensor can include an emitter as described above and a detector for detecting transmitted electromagnetic radiation from a portion of the first or second gear 116. The detector can be any of the detectors described above and known in the art. The emitter and detector can be arranged such that the emitter is positioned facing one side (e.g., front) of the first or second gear 116, and the detector is positioned facing the opposite side of the first or second gear 116. Alternate embodiments of the invention may measure other optical characteristics such as absorptance, scattering efficiency and the like in a similar manner e.g., by suitably orienting an emitter for emitting electromagnetic radiation toward a portion of the first and/or second gears 114, 116 and a detector for measuring 162 the desired optical characteristic.

In some embodiments, the separation member 126 can be substantially transparent to at least a portion of the spectrum of the emitted and reflected electromagnetic radiation (e.g., 300-700 nm, 700-1100 nm, 1100-2500 nm, etc.). Alternatively, a portion of the separation member 126 may be substantially transparent to at least a portion of the spectrum of the emitted and reflected electromagnetic radiation. In certain embodiments, an optical filter (not shown) can limit background radiation from entering 162 the sensor and/or oval gear meter 100. In some embodiments, the optical filter can be a thin film deposited on the cover 122 and/or the separation member 126. Transmittance of the optical filter can be tuned in various spectral ranges to minimize background radiation from interfering 162 with the measurement of the desired optical characteristic.

The separation member 126 can be aligned with the optical filter, optical sensor, and the first and second gears 114, 116 to provide the optical sensor with a view of at least part of the first and second gears 114, 116 through a portion of the separation member 126 and/or optical filter. The separation member 126 and cover 122 may also be at least partially transparent to allow an operator to visually observe operation of the flow meter. In one example, the cover 122 and separation member 126 may be made of a material that transmits a sufficient amount of visible light such that the first and/or the second gears 114, 116 are discernible through the cover 122 and the separation member 126. In another example, the cover 122 and separation member 126 are substantially transparent to visible light such that the first and/or the second gears 114, 116 are completely, or substantially completely visible through the cover 122 and the separation member 126. Alternatively, the cover 122 and separation member 126 are partially transparent (e.g., translucent) to allow a person to at least discern movement of the first and/or the second gears 114, 116. In some embodiments best illustrated in FIG. 3, the separation member 126 can be positioned behind an optical aperture 140. When positioned as such, a portion of the first and/or second gears 114, 116 may be visible through the optical aperture 140 and the separation member 126.

The optical characteristic can be measured from a portion of at least one of the first and second gears 114, 116. In one example, the optical characteristic can be measured from a first surface 142 of the first and/or second gears 114, 116. In this example, the first surface 142 may have an optical characteristic different in magnitude from the optical characteristic of the remainder of the first and/or second gears 114, 116. When the first surface 142 of the first and/or second gears 114, 116 is in the field of view of the detector, the detector registers a signal representative of the reflectance of the first surface 142 of the first and/or second gears 114, 116. As the first and second gears 114, 116 continue rotating, a second surface 144 may appear in the field of view of the detector. At this instance, the detector registers a signal representative of the reflectance of the second surface 144 of the first and/or second gears 114, 116. Based on the differences in the signal due to reflectance of the first surface 142 and the second surface 144, the optical sensor may discern gear rotation.

Figure 4:
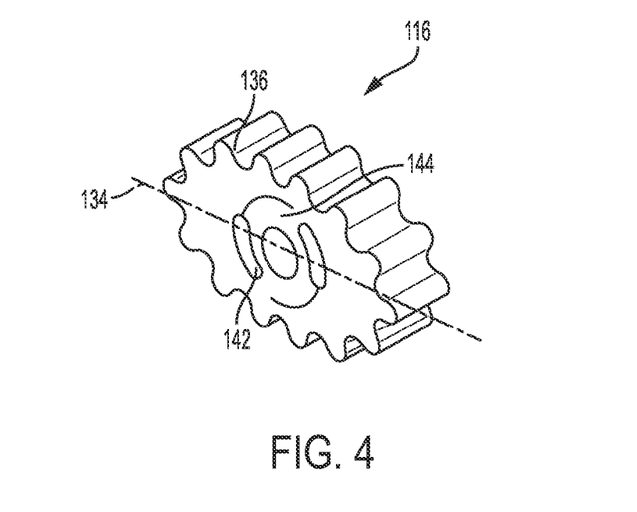
FIG. 4 is an exploded perspective view of an oval gear according to some embodiments of the invention.
Figure 5:
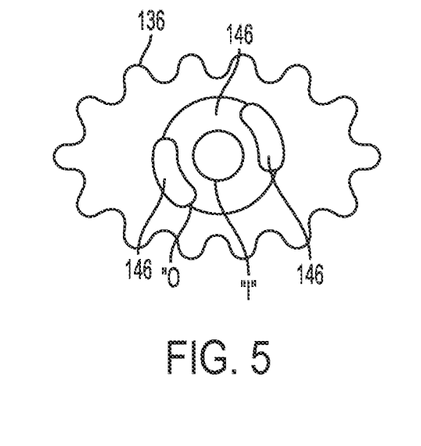
FIG. 5 is a front view of the oval gear of FIG. 4.
Figure 6:
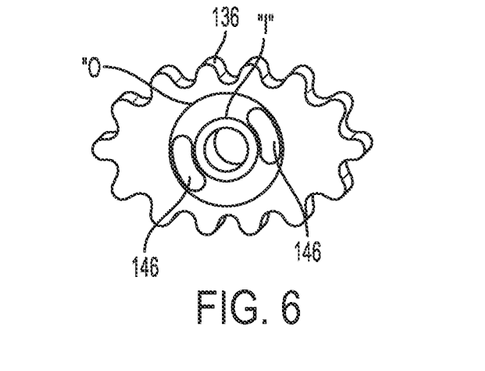
FIG. 6 is a front perspective view of an oval gear according to some embodiments of the invention.

As disclosed in U.S. Pat. No. 8,069,719, assigned to the assignee of the instant application, and as best illustrated in FIGS. 4-6, an insert 146 can be positioned on the first and/or second gears 114, 116 to facilitate improved detection of gear rotation. The insert 146 provide the optical sensor with sufficient contrast to distinguish between the optical characteristics of the insert and other areas of the gear. As the inserts do not span 360 degrees, during a full rotation of the first and/or second gears 114, 116, the insert 146 may be visible via the separation member 126 and the optical aperture 140 for a discrete duration, rather than continuously during the rotation of the gears. Thus, by counting the number of instances when the insert 146 is visible, the gear rotation may be discerned. The insert 146 can be of any desired shape. In the embodiment illustrated in FIGS. 4-6, the insert is bean-shaped. In certain embodiments, the insert 146 is white, with the surface of the first and/or second gears 114, 116 being black. Alternatively, the insert 146 can be black, with the surface of the first and/or second gears 114, 116 being black. In the embodiments illustrated in FIGS. 4-6, the surface of the first and/or second gears 114, 116 is black and the insert 146 is white. In such embodiments, the insert 146 can have optical characteristics (e.g., reflectance, transmittance, etc.) that are different from the first and/or second gears 114, 116, thereby allowing the sensor to discern from when the inserts 146 are in a field of view of the optical sensor. By measuring an optical characteristic of the insert 146, the optical sensor registers "an insert count" corresponding to when the insert 146 is in the field of view of the optical sensor. The insert counts can be related to the number of rotations of the first and/or second gear 114, 116, thereby allowing the gear rotational count and/or speed of rotation can be measured.

The insert 146 and the first and/or second gears 114, 116 may be manufactured separately, and the insert 146 can be press-fitted into the first and/or second gears 114, 116 such that it is substantially flush with the surface of the first and/or second gears 114, 116. Alternatively, or additionally, the insert 146 can be formed by molding. In some embodiments best seen in FIG. 6, the insert 146 may be positioned between an inner ring "I" and an outer ring "O". As shown in FIG. 6, each insert may abut against a portion of the inner ring "I" and the outer ring "O". When positioned, the insert 146 may be seated snugly in the first and/or second gears 114, 116 and substantially flush with the surface of the first and/or second gear 114, 116.

While not illustrated in FIGS. 4-6, the first and/or second gears 114, 116 receive a beam of electromagnetic radiation from an emitter (e.g., an external visible, UV, or IR source). In some embodiments, the insert 146 may be configured for reflecting the beam to the detector. Referring back to FIG. 3, a portion of the first and/or second gears 114, 116 may be visible via the separation member 126 and/or optical aperture 140 as described elsewhere herein. Other areas of the first and/or second gears 114, 116 may redirect the incident electromagnetic radiation into other directions. As the first and second gears 114, 116 rotate, for every instance when the insert 146 is in the field of view of the detector, the detector receives a reflected beam from the insert. At other instances when the insert 146 is not in the field of view of the detector, the detector receives scattered beams from other areas of the first and/or second gears 114, 116. Based on any differences between the signals due to reflection from the insert 146 and those due to scattering from other areas of the first and/or second gears 114, 116, the rotational count and/or speed of rotation of the first and/or second gears 114, 116 can be measured.

In some cases, the signals due to reflection from the insert 146 may not have sufficient accuracy to measure certain types of flows. Alternatively, or additionally, the insert 146 may not be mounted flush with the surface of the first and/or second gears 114, 116, leading to unstable signals during gear rotation. Additionally, inserts may increase manufacturing costs. In certain embodiments, the insert 146 may be replaced by patterns machined on the surface of the first and/or second gears 114, 116. FIGS. 7A-13 illustrate various views of an oval gear 200 suitable for use as the first or second gear 116 according to certain embodiments of the invention. While an oval gear 200 is illustrated in FIGS. 7A-13, it should be understood that the embodiments described with respect to FIGS. 7A-13 can be used with rotating members of any positive displacement flow meter.

In the illustrated embodiments shown in FIGS. 7A-13, the insert 146 is replaced by one or more normally-reflecting portions 150 on the surface of the oval gear 200 positioned in apposition to a non-normally reflecting portion 152. As used herein, normal reflection refers to a reflected ray reaching a detector 202. In other words, if a beam of electromagnetic radiation is reflected toward a detector 202, such reflection is referred to as a "normal" reflection. Alternatively, if a beam of electromagnetic radiation is reflected in a direction away from the detector 202, such reflection is referred to as a non-normal reflection. FIGS. 7B and 7C show an emitter 201 and a detector 202 positioned in apposition to the oval gear 200 at different instances. Electromagnetic radiation from emitter 201 reaches the oval gear 200 at the normally-reflecting portion 150. The beam reflected by the normally-reflecting portion 150 is directed towards the detector 202. In certain embodiments, the angle of incidence "$A_i$" with respect to the normal directions "N1", "N2", "N3", "N4" and "N5" can be selected to optimize the intensity of the reflected beam reaching the detector 202. At optimal angles of incidence the reflection from the normally-reflecting portions 150 of the oval gear 200 may produce beams of uniform intensity directed toward the detector 202.

The normally-reflecting portion 150 can reflect beams of electromagnetic radiation to a detector 202, thereby facilitating measurement of gear rotational count and/or speed. The normally-reflecting portion 150 does not span an entire circumference (e.g., 360 degree rotation) of the oval gear 200. In the illustrated embodiment shown in FIG. 7A, the normally reflecting portion spans between about one-quarter to one-half of a circumference "D" of the oval gear 200. The normally-reflecting portion 150 is therefore in the field of view of the detector intermittently as the oval gear 200 rotates. For example, the normally-reflecting portion 150 may be in the field of view of the detector once per full rotation of the oval gear 200. The normally-reflecting portion 150 may remain in the field of view of the detector for an interval of time less than the time taken by the oval gear 200 to complete one full rotation. As a result, the beam reflected by the normally-reflecting portion 150 impinges on the detector intermittently during the rotation of the oval gear 200. By counting the instances when the detector receives a signal due to reflection from the normally-reflecting portion 150, the rotational count and/or speed of rotation of the oval gear 200 can be determined. For instance, the normally-reflecting portion 150 can be in the field of view of the detector for a fraction of a rotation interval. The rotation interval may correspond to the time taken by the oval gear 200 to complete one rotation (i.e., sweeping an angle of about 360 degrees to complete one rotation). In other words, when a beam of electromagnetic radiation is incident on the normally-reflecting portion 150, the incident beam is reflected in a first direction "E". In some embodiments, best illustrated in FIG. 7B, the first direction "E" makes an angle "$A_r$" with the normal direction "N". In some embodiments, if the director is in-line with a beam emitter 201 (e.g., a single optical device serving as both emitter 201 and detector 202), the first direction "E" is parallel to the normal direction "N", and the reflected beam makes an angle of about 180 degrees with the incident beam direction "C".

Figure 7A:
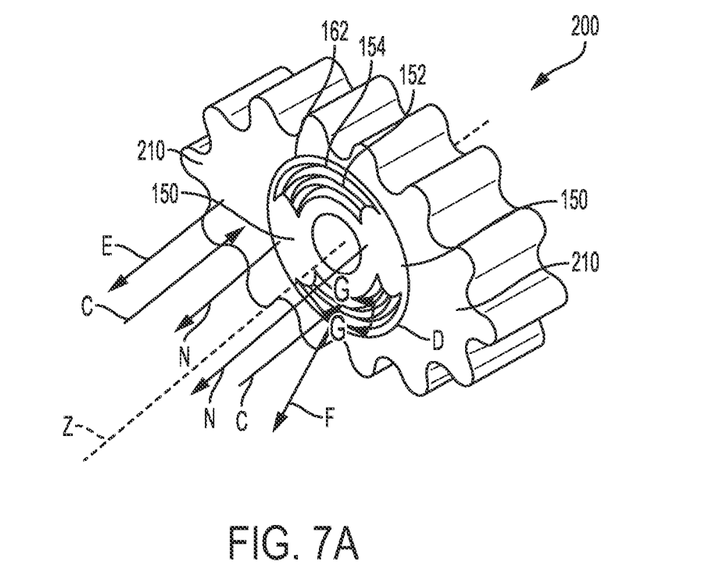
FIG. 7A is a perspective view of an oval gear according to a first embodiment.
Figure 7B:
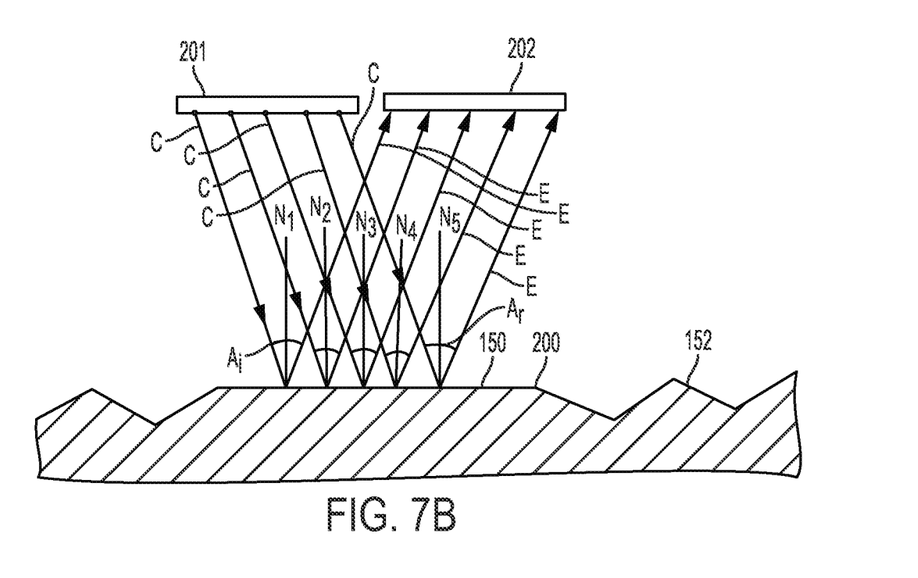
FIGS. 7B and 7C are front elevation view of a portion of the oval gear of FIG. 7A showing beam reflections from normally-reflecting and non-normally reflecting portions.
Figure 7C:
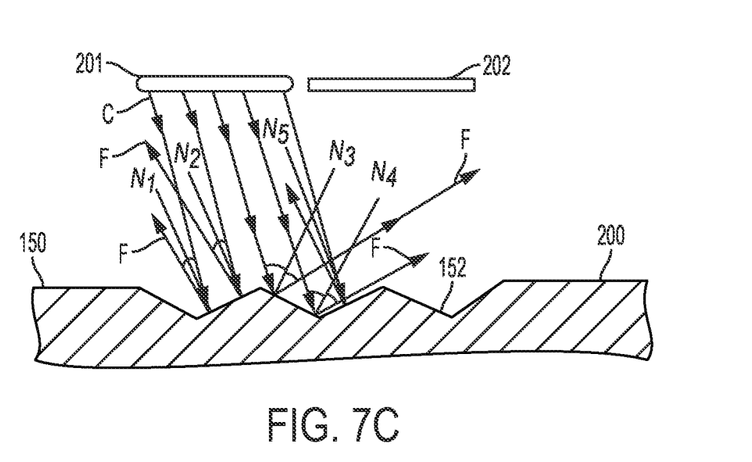
Figure 8:
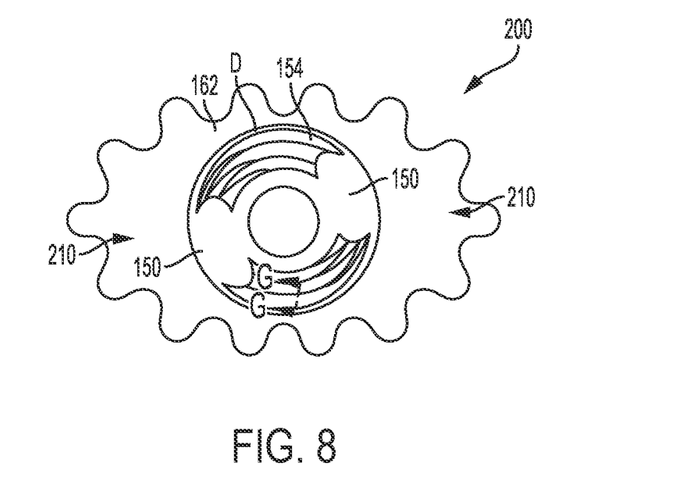
FIG. 8 is a perspective view of an oval gear according to some embodiments of the invention.
Figure 9:
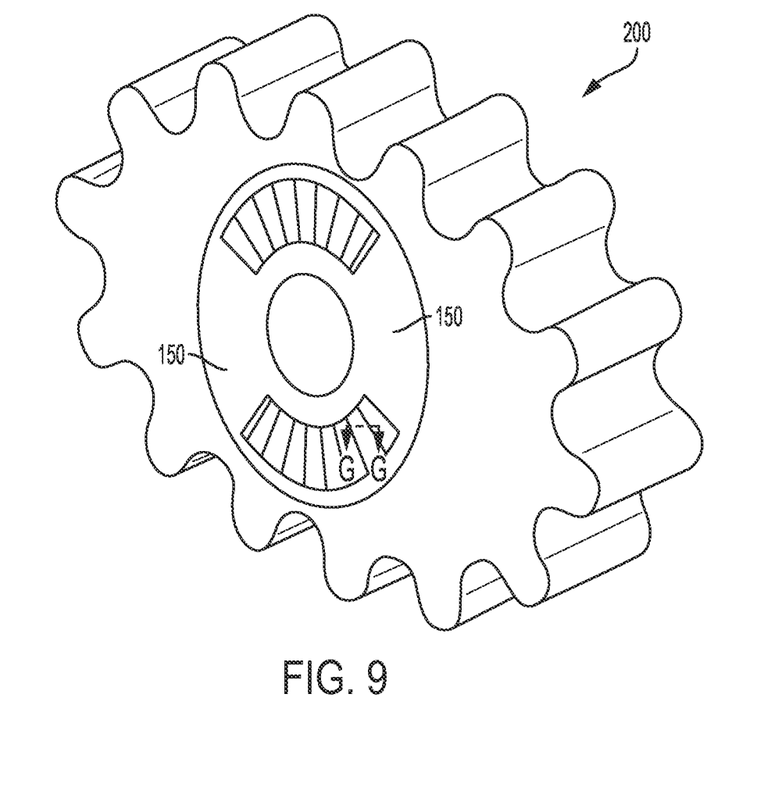
FIG. 9 is a perspective view of an oval gear according to some embodiments of the invention.

FIG. 7C shows reflection from the non-normally reflecting portion 152. The non-normally reflecting portion 152 has non-uniform orientations relative to incident beam and most of reflected beams do not reach detector 202. The non-normally reflecting portion 152 reflects electromagnetic radiation into directions away from the detector 202, (e.g., away from the detector 202). As illustrated in FIG. 7A, the non-normally reflecting portion 152 reflects electromagnetic radiation in a second direction "F". In certain embodiments, the second direction "F" makes an angle not equal to about 180 degrees with the direction of the incident beam "C". The second direction "F" can make any angle other than 180 degrees with the direction of the incident beam "C". If a detector is positioned in-line with the normal direction "N", the detector may detect beams reflected by the normally-reflecting portion 150, whereas beams reflected by the non-normally reflecting portion 152 may not impinge on or otherwise be sensed by the detector.

When the normally-reflecting portion 150 is in the field of view of the detector (e.g., phototransistor, camera etc.), it registers a reflected signal. For instance, a surface of the detector can be parallel to the plane of the normally-reflecting portion 150. The surface of the detector can intercept the electromagnetic radiation reflected by normally-reflecting portion 150. In contrast, if the non-normally reflecting portion 152 is in the field of view of the detector, it reflects electromagnetic radiation into directions other than those in line with the detector, and the detector may not register a signal. Based on the differences in the signal registered by the detector when the normally-reflecting portion 150 is in view, and the signal registered by the detector when the normally-reflecting portion 150 is not in view, the rotational count and/or rotation speed can be determined.

In some embodiments, the normally-reflecting portion 150 is made from the same material as the oval gear 200. The normally-reflecting portion 150, while illustrated as having a bean-shape, can have any shape and positioned anywhere on the surface of the oval gear. The normally-reflecting portion 150 can be substantially planar, and be level with the surface 210 of the oval gear 200 as seen in FIG. 7A. Alternatively, the normally-reflecting portion 150 may be higher than the surface 210 of the oval gear 200 by about 1/1000 inches (i.e., 1 mil) or about 1/500 inches (i.e., 2 mils). The normally-reflecting portion 150 can be manufactured by molding. The mold may result in a substantially reflective surface having a reflectance of between about 1% and about 30%. In certain embodiments, the substantially reflective surface has a reflectance of between about 5% and about 20%.

Figure 10:
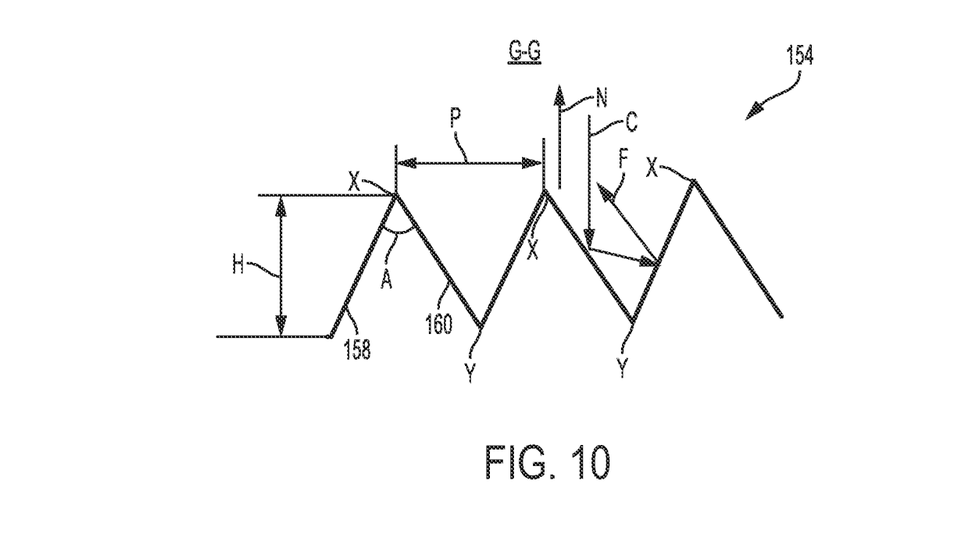
FIG. 10 is a cross-sectional view of a portion of the oval gear taken along G-G of FIGS. 7A, 8 and 9.
Figure 11:
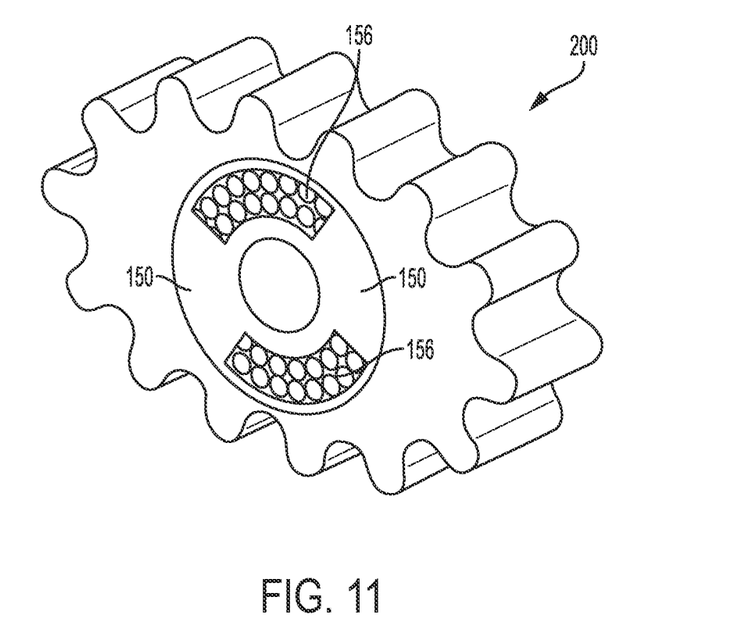
FIG. 11 is a perspective view of an oval gear according to some embodiments of the invention.
Figure 12:
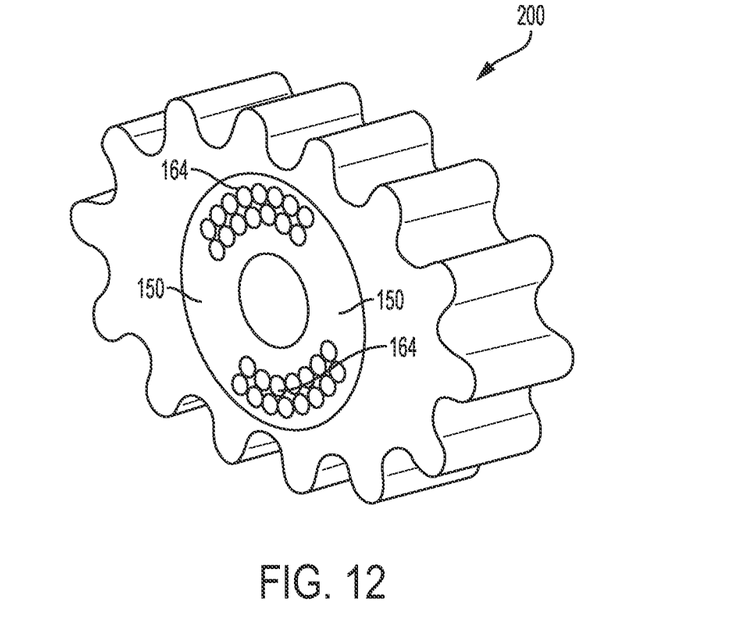
FIG. 12 is a perspective view of an oval gear according to some embodiments of the invention.

As seen in FIGS. 7A-9 the non-normally reflecting portion 152 may include spiral, radial and concentric grooves 154, or pins 156 as seen in FIGS. 11 and 12. As shown in FIG. 7A, the oval gear 200 includes a plurality of spiral grooves 154 to enhance detection of the beam reflected from the normally-reflecting portion 150. In the illustrated embodiment shown in FIG. 10, the grooves 154 have a height "H", and adjacent grooves 154 are spaced apart by a pitch "P". As seen in FIG. 10, the grooves 154 may be formed such that they define a groove angle "A" between adjacent first and second sloping surfaces 158, 160. Electromagnetic radiation may be incident on the sloping surfaces of the grooves 154 (e.g., near peaks "X", or valleys "Y") and be reflected by an angle based on the groove angle "A". For instance, a first beam of electromagnetic radiation can be incident on the first sloping surface 158 of the groove. The first beam of electromagnetic radiation can then be reflected by the first sloping surface 158 toward the second sloping surface 160. The second sloping surface 160 may further reflect the first beam of electromagnetic radiation in a direction non-parallel (e.g., along second direction "F") to the normal direction "N". In the illustrated embodiments, the height "H" can be between about 0.1 millimeters and about 2 millimeters. The pitch "P" can be between about 0.3 millimeters and about 6 millimeters. The groove angle "A" can be between about 90 degrees and about 150 degrees. However, any height, pitch and groove angle can be used.

Without being bound by any specific definition, the dimensions, angle and pitch of the grooves 154 can be chosen so as to differentiate the signal detected by the detector due to reflection from the normally-reflecting portion 150, by diverting reflected beams from the non-normally reflecting portion 152 away from the detector. Referring now to FIG. 10, in certain embodiments, the groove angle "A" can be any angle other than 90 degrees, to prevent an incident beam of electromagnetic radiation from being reflected by the grooves 154 (e.g., by multiple reflections on a first surface and a second surface of the groove) back to the detector. Additionally, the incidence direction "C" of the electromagnetic radiation can be chosen to avoid such back reflections from the grooves 154 to the detectors. For example, the grooves 154 may be designed such that groove angle "A" equals 30 degrees. Alternatively, the groove angle "A" can be 40 degrees. In alternate embodiments, the groove half angle A/2 can be any angle other than 45 degrees.

Referring back to FIG. 7A and with reference to FIG. 10, the spiral grooves 154 may be contained within a ring 162. The grooves 154 may be defined such that they cover 122 an entire circumference of the ring 162. For instance, the spirals span 360 degrees about the axis "Z" of the oval gear 200. Alternatively, the grooves 154 may be arranged symmetrically about the axis "Z" without having to cover 122 the entire circumference of the ring 162. The grooves 154 can be made such that the ring 162 and peaks "X" of the grooves 154 can be higher than the surface of the oval gear 200. For instance, the ring 162 and the peaks "X" can be between about 1/1000 inches (i.e., 1 mil) and about 1/500 (i.e., 2 mils) inches higher than the surface of the oval gear 200. Adjacent peaks "X" can be of the same height as the ring 162. Alternatively, the peaks "X" and the ring 162 can be of the same height as the surface of the oval gear 200. The grooves 154 can be made such that the valleys "Y" of the grooves 154 can be below the height of the peaks "X", the ring 162 and the surface of the oval gear 200.

FIG. 11 illustrates an oval gear 200 according to another embodiment. In the illustrated embodiment, instead of grooves 154, the non-normally reflecting portion 152 of the oval gear includes a plurality of pins 156 extending therefrom. The pins 156 are conical in shape in the illustrated embodiment. However, the pins 156 can be of any shape such as cylindrical, hemispherical, pyramidal, or irregular shapes. Without wishing to be bound by any theory, any shape that prevents an incident beam of electromagnetic radiation from being reflected normally (e.g., reflected beam forming an angle of 180 degrees with respect to the incident beam) back to the detector can be used.

The pins 156 can be arranged in any manner. Any arrangement of the pins 156 that provides optimal reflection of electromagnetic radiation in a non-normal direction can be used. In the illustrated embodiment, the pins 156 are arranged in a randomly staggered arrangement in the central portion of the oval gear. In other examples, a periodic arrangement of pins 156 about the circumference can be provided. Alternatively, the pins 156 can be arranged such that they define concentric, radial or spiral curves. The pins 156 can be formed of the same material as the oval gear 200. For instance, the pins 156 can be of PEEK. As is the case with the oval gear 200 surface, the pins 156 may also have a reflective finish and be of black or other dark colors. The pins 156 can be formed during the molding process used for forming the oval gear 200.

While the illustrated embodiments shown in FIGS. 7A-11 include grooves 154 and pins 156, other non-normally reflecting portion 152 can include holes, dimples and the like as seen in FIG. 12. Although areas between the holes 164 that may absorb or otherwise "trap" the incident electromagnetic radiation (e.g., due to multiple internal reflections), such a non-normally reflecting portion 152 may still be used. Holes, dimples and the like may be machined from a molded portion of the oval gear 200 with a machining tool suitable for machining polymers such as PEEK. Embodiments such as those illustrated in FIGS. 7A-13 can facilitate eliminating inserts, thereby resulting in an oval gear with fewer parts and lower costs than those with inserts. In the absence of inserts, measurement uncertainties due to improperly engaging the inserts on the gears can also be eliminated. In other embodiments, the normally-reflecting portion 150 may be polished as shown on FIG. 11 and FIG. 12 whereas areas surrounding the pins 156 or holes 164 have a grounded and/or unpolished surface finish. Electromagnetic radiation may be reflected by the polished areas (e.g., normally-reflecting portion 150). Electromagnetic radiation will be scattered from grounded areas. Scattering may produce a difference in signals (e.g., sensed by detector 202 of FIGS. 7B and 7C) from polished and grounded areas thereby allowing detection of gear rotation.

Embodiments of the oval gear meter disclosed herein can be useful for monitoring and measuring characteristics of flow in different systems. For instance, the oval gear meter can be used to detect chemical concentration, or to detect and measure flow volume, volumetric flow rate and other characteristics to prevent out of product conditions in a number of applications. Embodiments disclosed herein can lead to improved measurement accuracy. The simple design of the oval gear meter may result in low manufacturing costs.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A flow measuring system, comprising:
   a housing fluidly coupled to a fluid inlet and a fluid outlet, the housing defining a passage for a flow of a fluid;
   a first rotating member disposed in the housing;
   a second rotating member disposed in the housing, the second rotating member intermeshing with the first rotating member, the first and second rotating members adapted to rotate synchronously in response to the flow through the passage of the housing,
   at least one of the first rotating member and the second rotating member having a normally-reflecting portion,
   at least one of the first and second rotating members having a non-normally reflecting portion; and
   a sensor operatively connected to the housing, and being optically aligned with the normally-reflecting portion,
   the normally-reflecting portion adapted to reflect an incident beam in a first direction toward the sensor, the non-normally reflecting portion adapted to reflect the incident beam in a second direction away from the sensor,
   the sensor adapted to measure optical characteristics of a beam reflected by the normally-reflecting portion, and determine at least one of a rotational count indicative of a number of rotations of the first rotating member or the second rotating member, and a speed of rotation of the first rotating member or the second rotating member based on the optical characteristics of the beam reflected by the normally-reflecting portion,
   wherein the flow measuring system determines characteristics of the flow based on at least one of the rotational count and the speed of rotation.

2. The flow measuring system of claim 1, wherein the normally reflecting portion lies in a plane normal to a rotational axis of the at least one of the first rotating member and the second rotating member.

3. The flow measuring system of claim 1, wherein the normally reflecting portion is formed integrally with the non-normally reflecting portion.

4. The flow measuring system of claim 1, wherein the normally reflecting portion is formed integrally with the at least one of the first rotating member and the second rotating member.

5. The flow measuring system of claim 1, wherein the first rotating member has both the normally-reflecting portion and the non-normally reflecting portion.

6. The flow measuring system of claim 1, wherein the non-normally reflecting portion comprises a plurality of grooves, each groove adapted to reflect the incident beam in the second direction.

7. The flow measuring system of claim 6, wherein each of the plurality of grooves has a triangular cross-section.

8. The flow measuring system of claim 6, wherein each of the plurality of grooves has a groove angle defined by a first sloping surface and a second sloping surface of the groove, wherein the groove angle is between about 90 degrees and about 150 degrees.

9. The flow measuring system of claim 8, wherein a first beam of electromagnetic radiation is incident on the first sloping surface of the groove, the first beam of electromagnetic radiation being reflected by the first sloping surface toward the second sloping surface, the second sloping surface further reflecting the first beam of electromagnetic radiation in the second direction.

10. The flow measuring system of claim 6, wherein the sensor comprises an emitter and a detector, the emitter adapted to emit electromagnetic radiation toward at least the normally-reflecting portion, and the detector adapted to detect electromagnetic radiation reflected by the normally-reflecting portion.

11. The flow measuring system of claim 10, wherein the detector is oriented such that at least a surface of the detector is parallel to the plane of the normally-reflecting portion, the surface of the detector intercepting the electromagnetic radiation reflected by the normally-reflecting portion.

12. The flow measuring system of claim 6, wherein the plurality of grooves are disposed in a spiral pattern about an axis of the at least one of the first rotating member and the second rotating member.

13. The flow measuring system of claim 6, wherein the plurality of grooves are disposed concentrically about an axis of the at least one of the first rotating member and the second rotating member.

14. The flow measuring system of claim 6, wherein the plurality of grooves are disposed radially about an axis of the at least one of the first rotating member and the second rotating member.

15. The flow measuring system of claim 1, wherein the non-normally reflecting portion comprises a plurality of pins, each pin adapted to reflect electromagnetic radiation in the second direction.

16. The flow measuring system of claim 15, wherein each of the plurality of pins are of conical shape.

17. The flow measuring system of claim 1, wherein the first and second rotating members are made of a first material, and wherein the non-normally reflecting portion is made of the first material.

18. The flow measuring system of claim 1, wherein the first and second rotating members are oval gears.

19. The flow measuring system of claim 1, wherein the normally-reflecting portion is in a field of view of the sensor intermittently for every complete rotation of the first and second gears.

20. The flow measuring system of claim 19, wherein the normally-reflecting portion is in the field of view of the sensor for a fraction of a rotation interval, the rotation interval corresponding to the time taken by the first and second gears to complete one rotation, wherein the first and second gears sweep an angle of about 360 degrees to complete one rotation.

21. A flow measuring system for measuring characteristics of fluid flow, the flow measuring system comprising a pair of rotating members rotating synchronously in response to the fluid flow, at least one rotating member comprising:
   a normally-reflecting portion adapted to reflect an incident beam in a first direction; and
   a non-normally reflecting portion adapted to reflect the incident beam in a second direction different from the first direction,
   wherein the flow measuring system is configured for measuring optical characteristics of a beam reflected by the normally-reflecting portion along the first direction, the flow measuring system is adapted to determine rotational characteristics of the rotating member based on the optical characteristics of the beam reflected by the normally-reflecting portion along the first direction, and
   wherein the flow measuring system determines flow characteristics based on rotational characteristics of the rotating member.

22. The flow measuring system of claim 21, wherein the first direction makes an angle of about 180 degrees with a direction of the incidence beam.

23. The flow measuring system of claim 21, wherein the second direction makes an angle not equal to 180 degrees with a direction of the incidence beam.

24. The flow measuring system of claim 21, wherein the normally-reflection portion is disposed along a fraction of a circumference of the rotating member.

\* \* \* \* \*